(12) United States Patent
Blackmon et al.

(10) Patent No.: US 11,776,198 B1
(45) Date of Patent: Oct. 3, 2023

(54) SYSTEM AND METHOD FOR RENDERING MULTIPLE POLYGONS

(71) Applicant: OmniSci, Inc., San Francisco, CA (US)

(72) Inventors: Steve Blackmon, San Francisco, CA (US); Simon Eves, San Francisco, CA (US)

(73) Assignee: Heavy.AI, Inc., San Francisco, CA (US)

( * ) Notice: Subject to any disclaimer, the term of this patent is extended or adjusted under 35 U.S.C. 154(b) by 325 days.

(21) Appl. No.: 16/846,269

(22) Filed: Apr. 10, 2020

Related U.S. Application Data

(60) Provisional application No. 62/832,144, filed on Apr. 10, 2019.

(51) Int. Cl.
*G06T 15/10* (2011.01)
(52) U.S. Cl.
CPC .................................. *G06T 15/10* (2013.01)
(58) Field of Classification Search
CPC ....................................................... G06T 15/10
USPC ......................................................... 345/419
See application file for complete search history.

(56) References Cited

U.S. PATENT DOCUMENTS

| | | | | |
|---|---|---|---|---|
| 8,570,322 | B2* | 10/2013 | Hanika | G06T 15/06 345/421 |
| 2004/0239672 | A1* | 12/2004 | Schmidt | G06T 15/80 345/426 |
| 2008/0198168 | A1* | 8/2008 | Jiao | G06T 11/40 345/506 |
| 2020/0051315 | A1* | 2/2020 | Laine | G06T 15/005 |

* cited by examiner

*Primary Examiner* — Charles Tseng
(74) *Attorney, Agent, or Firm* — Innovation Partners LLC; Charles E. Gotlieb

(57) ABSTRACT

A system and method builds triangles from vertices of polygons and stores the pixels overlayed at least in part by each triangle. The system and method then takes pixels overlayed by an even number of times for each polygon and renders them. Antialiasing information may be generated and provided by oring or exclusive oring bits representing each polygon for each of several pixel divisions.

3 Claims, 4 Drawing Sheets

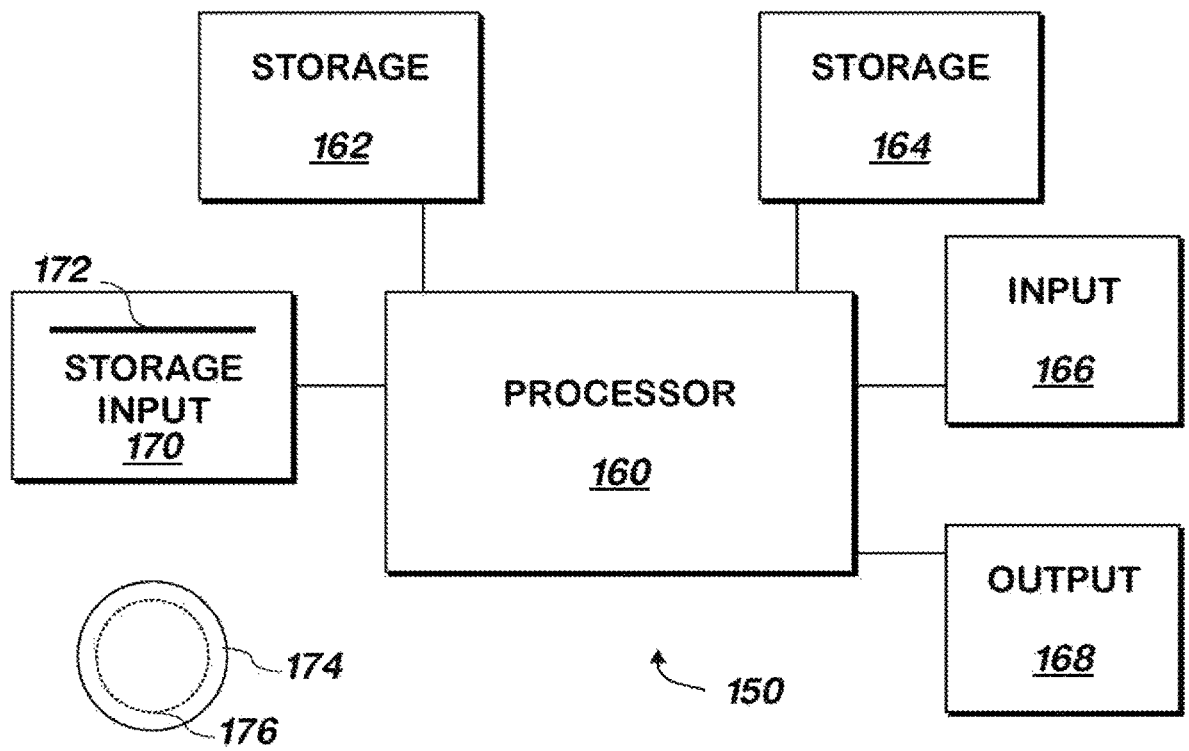
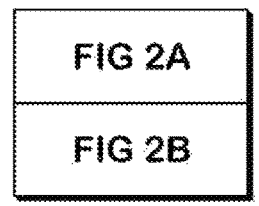
**FIG 1
(PRIOR ART)**
FIG. 2

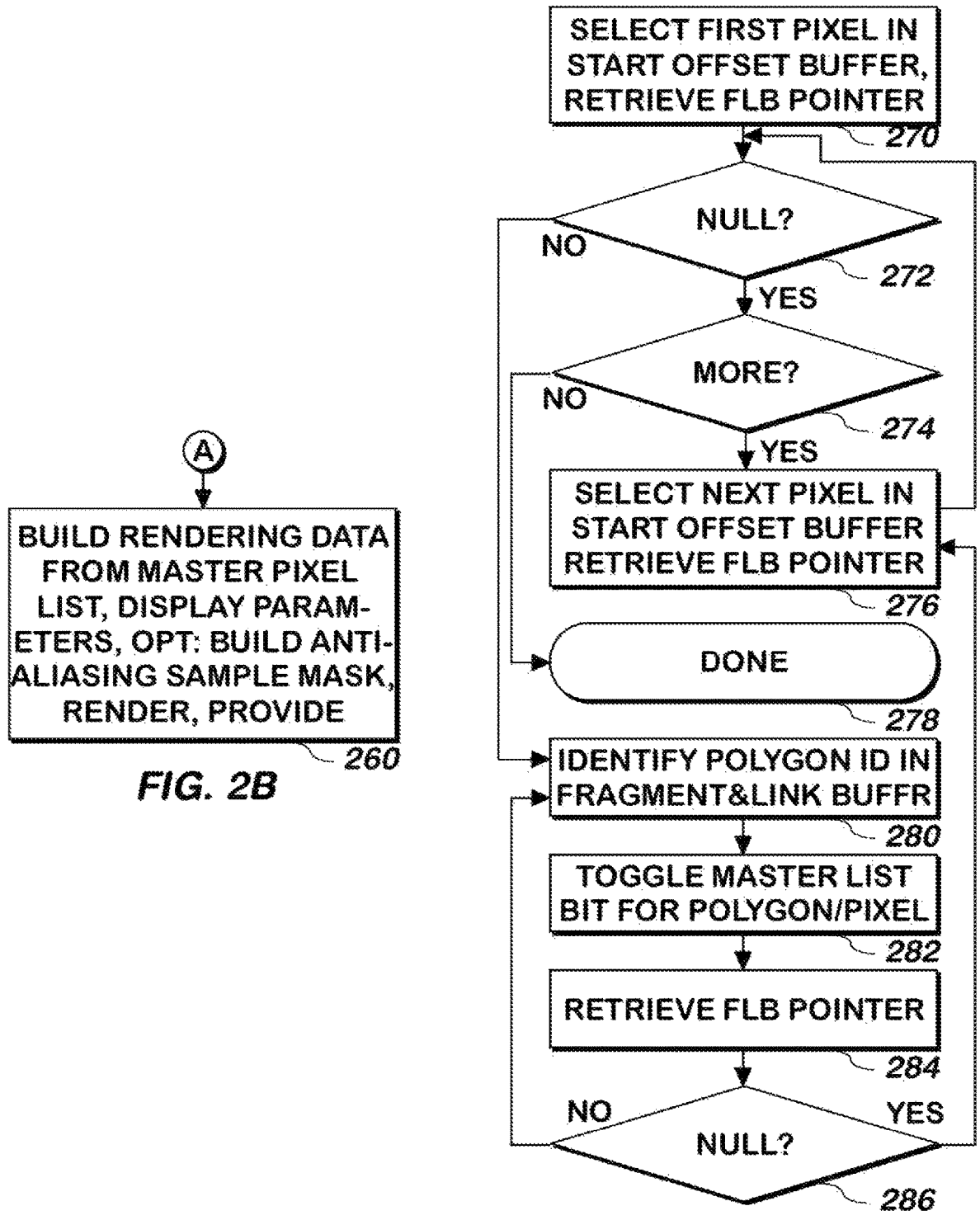

US 11,776,198 B1

SYSTEM AND METHOD FOR RENDERING MULTIPLE POLYGONS

RELATED APPLICATION

This application claims the benefit of U.S. Provisional Patent Application Ser. No. 62/832,144 entitled, "Method and Apparatus for Rendering Multiple Polygons" filed by Steve Blackmon and Simon Eves on Apr. 10, 2019, which is hereby incorporated by reference in its entirety.

FIELD OF THE INVENTION

The present invention is related to computer hardware and software and more specifically to computer image rendering hardware and software.

BACKGROUND OF THE INVENTION

Polygons are arbitrary shapes, such as those that may be used to represent zip codes, counties, states or other items. Polygons may be rendered by graphics processing units on a computer system. Conventional methods of rendering polygons are suboptimal. What is needed is a system and method for rendering polygons.

SUMMARY OF INVENTION

A system and method receives polygon rendering information and builds a set of triangles from every combination of three vertices of each polygon. The pixels inside of or on the edges of the resulting triangles thus generated from each polygon are then labeled as corresponding to that respective polygon, by adding them to a per pixel linked list. The number of times a given pixel is in the per pixel linked list for a given polygon is counted and only even numbered counts for each combination of the same pixel and polygon are then transferred to a master list of pixel/polygon combinations. The colors of the polygons are then used to build a set of rendering data that consists of the blended color of each polygon on the master list for a pixel.

Anti aliasing information may be additionally provided. The anti aliasing information may be identified by maintaining, for each pixel for each polygon, the portion of the pixel corresponding to that polygon. For example, a polygon that bisects a pixel is recorded as corresponding to half of the portions of the pixel. A single bitmask bit is generated for each portion of each pixel by setting the portion for a pixel if either any of the polygons correspond to that portion of that pixel or if only one of them does. The color of the pixel remains the blended color of all of the polygons that correspond to any portion of that pixel. In one embodiment, the color is identified without regard to the percentage of the pixel to which each polygon corresponds, though in another embodiment, such information is used in identifying the color of the pixel if more than one polygon corresponds to any portion of the pixel.

BRIEF DESCRIPTION OF THE DRAWINGS

FIG. 1 is a block schematic diagram of a conventional computer system.

DETAILED DESCRIPTION OF A PREFERRED EMBODIMENT

Figure 2A:
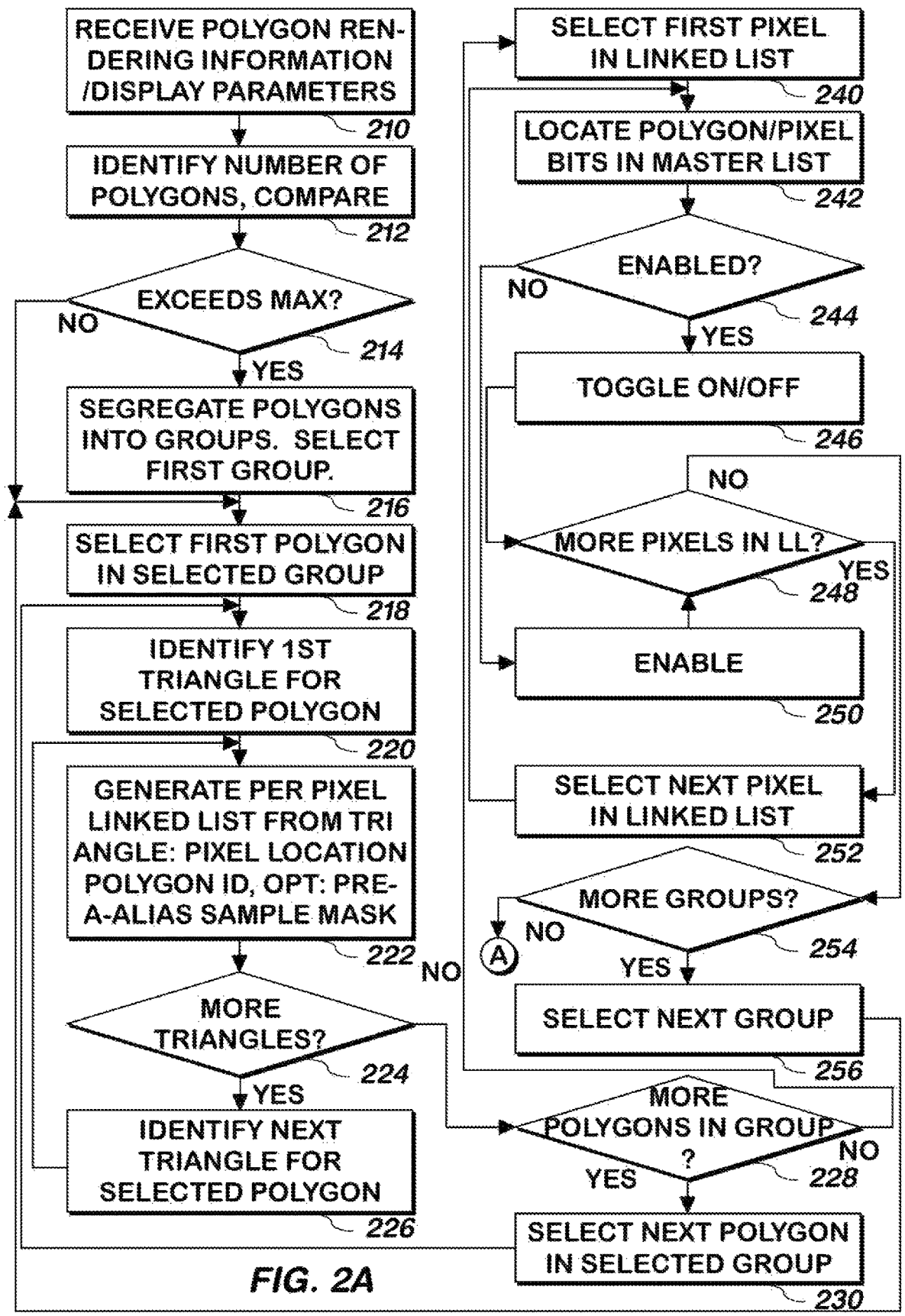
FIG. 2, consisting of FIG. 2A and FIG. 2B, is a flowchart illustrating a method of rendering polygons according to one embodiment of the present invention.
FIG. 2C is a flowchart illustrating a method of selecting pixels from a per pixel linked list according to one embodiment of the present invention.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile (i.e. non-transitory) storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system, elements may include a conventional processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, 7 or 8) commercially available from MICROSOFT Corporation of Redmond Wash. or a Macintosh computer system running the OS X operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Referring now to FIG. 2, consisting of FIGS. 2A and 2B, a method of rendering a plurality of polygons is shown according to one embodiment of the present invention. Polygon rendering information and display parameters for each polygon are received 210. The polygon rendering information may include vertices of the boundary of each polygon. The display parameters may include colors or shading of each polygon, or other similar information, which may be received with each polygon, or may be received separately. In one embodiment, the colors are implied, for example, by their order, or otherwise assigned as part of step 210, and not received. In one embodiment, each polygon is considered to be transparent, and the polygons are order independent, with the color of any point of overlap being a mixture of the colors of the polygons that overlap at that point. Other arrangements may be used, and the parameters include the information that is necessary to render them properly at points of overlap, such as order information and the like, in embodiments in which order independence is not used.

The number of polygons is identified and compared to a maximum number (e.g. 32) per group 212. If the number of polygons does not exceed the maximum 214, the entire set of polygons is considered to be the selected group and the method continues at step 218. If the number of polygons exceeds the maximum 214, the polygons are separated into groups that do not exceed the maximum number of polygons per group, and the first group is selected 216. In one embodiment, each polygon in a group is separated from the other polygons in the group so that the amount of overlap is eliminated, if possible, or an attempt is made to minimize or reduce the amount of overlap in any group. As used herein, overlapping polygons may include adjacent polygons, that share at least part of the same boundary.

Reducing overlap may be accomplished by minimizing the number or length of common boundaries for polygons in the same group, or using another rule to assign polygons to groups that limits such overlap, such as by selecting a first polygon, then selecting another polygon that does not overlap any of the polygons already selected. Selection may include selection from those within a threshold percentage of the maximum span of all of the polygons or the last selected polygon for that group, so that polygons that are selected in a group are relatively close to one another or to the prior selected polygon, though in other embodiments, such a constraint is not used.

The first polygon in the selected group is selected 218 and triangles are generated from every combination of three vertices of the selected polygon. The first such triangle is identified 220, for example, by selecting 3 the triangle built using vertices of the selected polygon that have not already been selected.

The vertices of the identified triangle are then used to generate entries in a per pixel linked list that identifies the pixel location, and the identifier of the polygon for each pixel in the triangle, or on its borders 222.

In one embodiment, a per pixel linked list contains two buffers. The first buffer, called a "start offset buffer" is a map of all of the pixels in a display area that will be used to display the polygons. It is a one or two dimensional array of pointers to the second buffer. In the case of the start of offset buffer having two dimensions, the two dimensions match the number of pixels on the boundaries in each of two dimensions (e.g. top and left) of the display area. For example, if the display area is 10 pixels by 15 pixels, the start offset buffer can be a 10×15 array of pointers. Alternatively, the start offset buffer may be a one dimensional array of 150 pointers, with the first row of pixels being represented by array elements 0-9, and the second row of pixels being represented by array elements 10-19, and so on. The pointers to the second buffer may be offsets from the start of the second buffer. So to point to the start of the second buffer, a pointer of 0 is used, and the next element in the second buffer is pointed to by a pointer value of 1. A special pointer value, such as −1, may be used to indicate a null pointer. When initialized, all values of this first buffer are initialized to a value of a null pointer, indicating the pixels are all empty.

The second buffer is referred to as a "fragment and link buffer". The fragment and link buffer includes a tuple that includes a code for the color contribution to the pixel of that tuple, and a pointer, which again may be an offset from the start of the second pointer, within the same second buffer, of the prior tuple that includes the code of the color contribution to that same pixel of the tuple, as well as a pointer to any prior tuple for that pixel.

When storing a new value for a pixel, the pointer from the start offset buffer is copied (even if it is null), and replaced with a pointer to the next unused location in the fragment and link buffer, and the pointer copied is stored into the space for the pointer at that next unused location in the fragment and link buffer. The color contribution for the pixel is added at that same (now formerly) next unused location in the fragment and link buffer.

So, as an example use of a per pixel linked list in a simplified, non polygon example, to draw one two pixel wide line in red starting at the upper left hand corner, and a two pixel long line in blue starting at the upper left hand corner, the first buffer is initialized to all −1s. The second buffer need not be initialized, as only the pointers from the first buffer will be used to access the second buffer. The pointer from the first buffer at coordinates 0,0 is −1 and that is copied to the pointer storage of the 0 element of the second buffer. The pointer in the 0,0 position of the first buffer is set to 0, to point to the 0 element of the second buffer. The color code for red is then added to the color storage at the 0 element of the second buffer. The pointer from the first buffer at coordinates 0,1 is −1 and that is copied to the pointer storage of the next available element in the second buffer and the pointer in the first buffer at the 0,1 position is set to the offset of that same position in the second buffer, 1. That completes the red line. The pointer from the first buffer at coordinates 0,0 is 0 and that is copied to the pointer storage of the next available element of the second buffer, at offset 2. The pointer in the 0,0 position of the first buffer is set to 2, to point to the element at offset 2 of the second buffer. The color code for blue is then added to the color storage at the 2 offset element of the second buffer. The pointer from the first buffer at coordinates 1,0 is −1 and that is copied to the pointer storage of the next available element in the second buffer and the pointer in the first buffer at the 1,0 position is set to the offset of that same position in the second buffer, 3. In the case of the pixel at the 0,0 position, there are two entries in the second buffer, located by following the pointer at 0,0 to offset 2, and then the pointer at that element of the second buffer to offset 0. The two color codes at those offsets can then be used to display the pixel.

In one embodiment, the polygon identifier may be added to each tuple in the fragment and link buffer, either in place of the color or in addition to it. The polygon identifier need not be stored in the same second buffer, as a third buffer may be used to store the polygon identifier, using the same offset as is referenced by the fragment and link buffer. The color code that is added to the fragment and link buffer may be identified from the display parameters.

It isn't necessary to use any particular data structure, as other data structures can be used. The per pixel linked list is one embodiment that can be used. Each of the pixels corresponding to the selected polygon, even if only partly covered by that polygon (or covered above a threshold percentage, such as 2 percent or a majority of one division), are added to the per pixel linked list.

In one embodiment a pre-anti aliasing sample mask is also built for each pixel as part of step 222 as the pixel is added. In one embodiment, each pixel is allocated into N pixel divisions. For example, if N is 4, each pixel is divided into quadrants. A conventional sample mask would indicate which pixel divisions would be "on" if the pixel divisions were separately specified, instead of the entire pixel. Pixels at the edge of a polygon boundary that bisected all of its pixels would then have halt or approximately half of the pixel divisions that are indicated as on, while those at the corners may have fewer or more. Pixels at the interior may have all of their pixel divisions indicated as on in one embodiment. However, instead of using one bit per pixel division, the number of bits in the pre-anti-aliasing sample mask uses one bit per polygon per pixel, division. So for example, if there are thirty two polygons, and pixel quadrants are used as divisions, there would be four sets of 32 bits, each set corresponding to a quadrant of the pixel, and each bit within the set corresponding to one polygon. That bit is set in the same manner the anti-aliasing bit would be set, though the data structure has a set of bits per pixel division instead of one. The bit corresponding to the polygon and pixel division in each set is set or cleared instead of the bit corresponding to just the pixel division, based on whether the pixel is on or inside the polygon boundary and if on the boundary, the location of the two vertices that define that boundary, as well as the location of the pixel.

If there are more triangles to be generated from the combinations of three vertices of the selected polygon 224, the next such triangle is generated 226 and the method continues at step 222 using the newly generated triangle.

If there are no more triangles to be generated from the selected polygon 224, if there are more polygons in the selected group 228, the next polygon is selected 230 and the method continues at step 220 using the newly selected polygon. If there are no more polygons in the selected group 228, the method continues at step 240.

At this point, the per pixel linked list may, for some pixels, have multiple pixel entries for the same pixel, generated by different overlapping triangles from the same polygon. Steps 240-252 described below carry out a rule that uses a given pixel for a given polygon, only if the number of triangles that partly or fully cover that pixel is an even number. If the number of triangles partly or fully covering that pixel is odd, the pixel is not in use by the polygon. The reason for this is that the polygon may be concave, and so triangles generated from its vertices may, in fact, not be in the polygon. Steps 240-252 serve to remove such pixels by effectively turning them to an off state.

At step 240, the first pixel in the per pixel linked list is selected. A pixel in the per pixel linked list is an entry that may not be unique to the combination of a pixel and a polygon. within the list A corresponding pixel is located in a master list of pixels 242. Whereas the per pixel linked list may contain multiple entries for the same pixel for the same polygon, the master list has only one entry per polygon for each pixel in the display area. In one embodiment, each entry for a combination of a polygon and a pixel consists of two bits: an enable bit and a toggle bit, both of which are initialized to "off" for all combinations of polygons and pixels. If the enable bit for the pixel and polygon is not set, 244, the enable bit is set 250, and the method continues at step 248. If the pixel and polygon is enabled in the master list because the enable bit is set 244, the toggle bit for that pixel is toggled to the opposite state it is in, off if it is currently on, and vice versa. The method continues at step 248.

At step 248, if there are more pixels not unused in the per pixel linked list, the next such pixel in the per pixel linked list is selected 252 and the method continues at step 242 using the newly selected pixel. Otherwise 248, the method continues at step 254.

In the embodiments in which a per pixel linked list is used, the traversal of the per pixel linked list is performed as described in FIG. 2C. Referring momentarily to FIG. 2C, a method of traversing a per pixel linked list to find the first and next pixels is shown according to one embodiment of the present invention.

The first pixel (e.g. at location 0,0) in the start offset buffer is selected and its pointer is retrieved 270. If the pointer in the selected pixel is null 272, the method continues at step 274 and otherwise 272, the method continues at step 280.

At step 280, the polygon identifier in the fragment and link buffer location pointed by the pointer retrieved from the start offset buffer is used to locate in the master list the selected pixel, and the polygon identifier is used to locate the corresponding bits. One of the two bits in the master list is toggled as described above and herein 282, and the corresponding fragment and link buffer pointer is retrieved 284.

If the retrieved pointer is not null 286, the method continues at step 280 using the newly retrieved pointer, and otherwise 286, the method continue at step 276.

At step 276, the next pixel in the start offset buffer is selected and its pointer to the fragment and link buffer is retrieved and the method continues at step 272.

At step 272, if fragment and link buffer pointer retrieved from the start offset buffer is null, if there are more pixels in the start offset buffer 274, the method continues at step 276 and otherwise 274, the building of the master list is complete 278.

Referring again to FIG. 2A, at step 254, if there are no more groups of polygons, the method continues at step 260 of FIG. 2B, and otherwise 254, the next group of polygons is selected 256 and the method continues at step 218 using the newly selected group of polygons.

At step 260 of FIG. 2B, the master pixel list is used to build the rendering data to render a final image. In one embodiment, the building of rendering data for a pixel uses the polygon and pixel data for that pixel in the master list. In one embodiment, the rendering data of a pixel is single bit, having a color equal to a blend of all of the colors whose polygons have toggle bits set for that pixel in the master list. The colors are those received as display parameters in step 210. Although the transparency of the polygons may be order independent, in other embodiments, ordering information is also used to render the pixel as the single bit. If none of the bits for the polygon at a given pixel location are set, a background color may be used for that pixel in the rendering data.

In one embodiment, anti-aliasing information is supplied for the rendering as part of step 260. To generate the anti-aliasing information, each set of N bits from the pre-anti aliasing sample mask is ored to a single bit that, in one embodiment, is set if any of the bits in the set is set, and not set otherwise; or is exclusive-ored that is set if only one of the corresponding bits is set, and is 0 otherwise. Each resulting bit in the anti-aliasing information then represents whether the corresponding pixel division is to be used, with the color for all of the divisions being the optionally blended color of the pixel indicated by the rendering data.

As part of step 260, the rendering data, and optionally the anti-aliasing bitmask is provided to a conventional graphics processing unit such as a conventional NVidia GTX or RTX graphics card commercially available from NVidia Corporation of Santa Clara, Calif., or an integrated graphics processing unit that is part of a CPU, such as those commercially available from Intel Corporation of Santa Clara, Calif., with a command to render such information. The graphics processing unit renders the data and provides it for display on a display screen.

System

Figure 3:
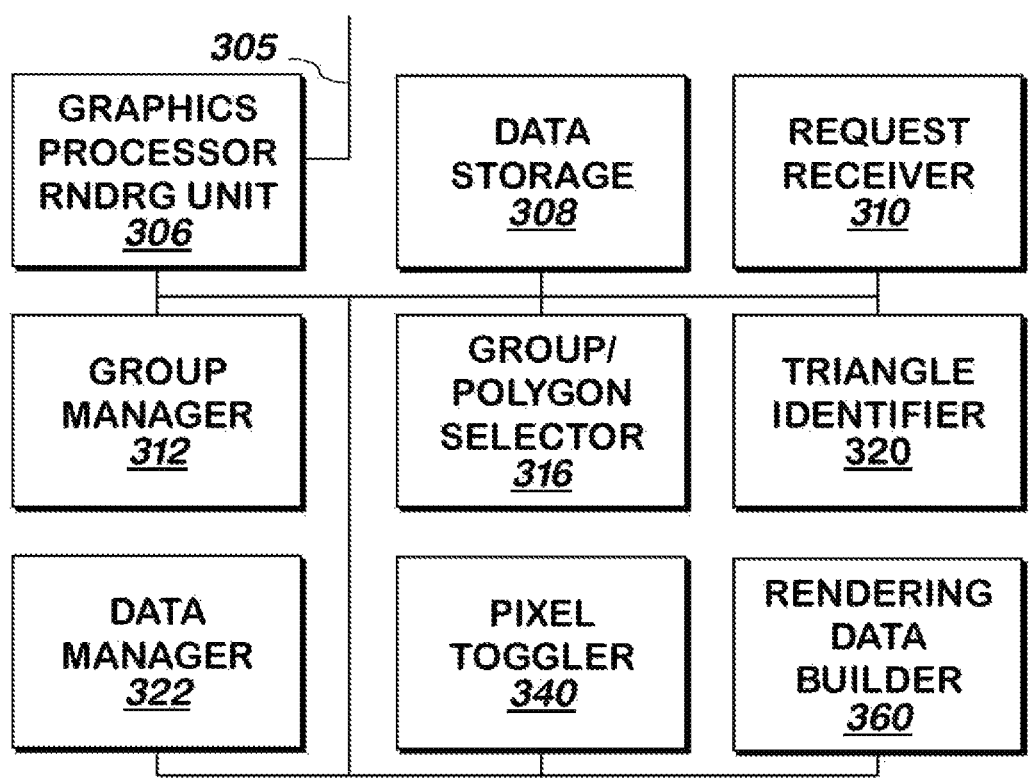
FIG. 3 is a block schematic diagram of a system for rendering polygons according to one embodiment of the present invention.

Referring now to FIG. 3, a system for rendering polygons is shown according to one embodiment of the present invention. The system may be implemented as software or firmware in a computer system and/or conventional graphics processing unit of a conventional graphics card, such as those commercially available from NVIDIA Corporation of Santa Clara, Calif., including the NVIDIA TITAN RTX Graphics Card.

Request receiver 310 receives the polygon rendering information, including display parameters, as described above, and stores it into data storage 308. Request receiver 310 signals group manager 312.

When signaled, group manager 312 identifies the number of polygons whose information is stored in data storage 308 and determines if the number exceeds a threshold. If so, the polygons are assigned to groups as described above. In one embodiment, the assignment to groups is accomplished by request receiver 310 providing the polygon information for each polygon to group manager 312 as it is received and group manager 312 storing a group identifier with the other information for each polygon into data storage 308, rather than waiting for all of the polygons to be stored and then assigning the group identifiers to each polygon, or group identifiers may be assigned by group manager 312 in data storage 308 to each polygon received or stored in data storage 308 as described above. In the event that only one group's worth of polygons is received, all of the polygons received will all have the same group identifier. Group manager 312 signals group/polygon selector 316, which it may do after the information for each polygon is received or after the information for all polygons is received. Group manager 312 or request receiver 310 assigns a unique polygon identifier to each of the polygons received or stored and stores the identifier into data storage 308 associated with each polygon. Group manager 312 signals group/polygon selector 316.

When signaled, group/polygon selector 316 selects the first group, and then selects a first polygon from the first group. Group/polygon selector 316 then provides a reference (e.g. the polygon identifier) to the selected polygon in data storage 308 to triangle identifier 320, which identifies the first triangle from the polygon information in data storage 308 corresponding to the reference it receives as described above and provides the coordinates of the triangle and the reference to data manager 322.

When it receives such information, data manager 322 generates into data storage 308 the data structure (including any initialization information) such as the per pixel linked list from the coordinates of the triangle and the other information associated with the polygon corresponding to the reference, as described above, and optionally includes the anti-aliasing information as described above. Data manager 322 signals triangle identifier 320, which selects the next triangle from the polygon that has not already been selected and repeats the process of sending its corresponding information to data manager 322, which processes it as described above and herein, until all of the triangles have been identified and processed from the polygon selected, at which point triangle identifier 320 signals group/polygon selector 316.

When signaled, group/polygon selector 316 selects the next polygon in the group and provides the reference of the selected polygon to triangle identifier 320, which repeats the process described above for the newly selected polygon. When there are no more polygons in the selected group, group/polygon selector 316 signals pixel toggler 340.

Pixel toggler 340 selects the first pixel in the data structure, such as the per-pixel linked list, and locates the polygon arid pixel bits in a master list as described above maintained in data storage 308. In one embodiment, the master list is initialized in pixel toggler by request receiver 310 as it receives the polygon information or thereafter by another element in the system. If the polygon and pixel enable bit is not enabled, pixel toggler 340 enables it and if there are more pixels in the data structure, it selects the next one and repeats the process described here. If the polygon and pixel enable bit is enabled, pixel toggler 340 toggles the toggle bit: if set, it clears it and if cleared, it sets it, and if there are more pixels in the data structure, it selects the next one and repeats the process described here. When there are no more pixels in the data structure, pixel toggler 340 signals group/polygon selector 316, which checks to see if there are more groups, and if so, repeats the process for the next group. If there are no more groups, group/polygon selector 316 signals rendering data builder 360.

It is noted that certain processes may run in parallel, including pipelining them. For example, the data structure may be built tor the next group by system elements 316-322 while pixel toggler 340 is processing the data structure for the current group. In such embodiment, different data structures are used for each group, and group/polygon selector 316 signals pixel toggler 340 with a reference to the data structure for the most recently completed group, which is provided by data manager 322 at the start of the processing of each group, which is indicated to data manager 322 by group/polygon selector 316 via triangle identifier 320. Such indication causes data manager 322 to start a new data structure, which may be performed using conventional double or multiple buffer techniques.

When signaled, rendering data builder 360 builds the rendering data from the master list as described above into a format that can be used by graphics processor rendering unit 306 and sends it to graphics processor rendering unit 306 which uses conventional techniques to render the rendering data and provide the rendered data to a display screen (not shown) via output 305. Graphics processing rendering unit 306 is part of a conventional graphics processor. The remainder of the system may be pert of the graphics processor, a different graphics processor, or a computer system, or specialized logic circuitry (and storage) that operates as described herein.

System elements may be used to perform different portions of the above description. Each system element may include a conventional hardware processor or hardware processor system or processor system or processor that is coupled to a hardware memory or hardware memory system or memory or memory system, each of these being conventional in nature. The processor is specially programmed to operate as described herein. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. System elements are coupled to one another to perform the functions described herein and may utilize data obtained in any possible manner.

Certain Embodiments

Described is a method of displaying two or more polygons, including:

receiving locations of each of two or more vertices and at least one visual characteristic of each of the two or more polygons;

identifying a triangle for each unique combination of three vertices of each polygon;

for each of the triangles, by a computer processor coupled to a graphics processor or by the graphics processor, adding a tuple including an identifier of the polygon corresponding to said triangle and an identifier of a pixel location to a first portion of a digital memory for each of two or more pixels corresponding to an interior of the triangle, resulting in two or more tuples including an identifier of a same pixel location and an identifier of a same polygon being simultaneously stored in the first portion of the digital memory for each of two or more pixels;

retrieving by the computer processor or graphics processor, the identifier of the polygon and the identifier of the pixel location for each of the pixels, from the first portion of the digital memory and, for each of the pixels, setting or clearing at least one bit in a set of two or more bits in a second portion of the digital memory, each set in the second portion of the digital memory corresponding to a single pixel and each single pixel for a polygon corresponding to no more than one set of the two or more bits in the second portion of the digital memory, the set in which the at least one bit is set or cleared corresponding to the pixel location retrieved;

generating by the computer processor or graphics processor rendering data from the sets of the two or more bits in the second portion of the digital memory and the at least one visual characteristic of at least some of the polygons in the two or more polygons; and directing the graphics processor to display the rendering data, thereby displaying causing the two or more polygons to be displayed on a display screen coupled to the graphics processor.

The method may contain additional features whereby the first, portion of digital memory comprises at least one pointer from one tuple corresponding to a given pixel location to another tuple corresponding to the given pixel location.

The method may additionally include:

receiving two or more vertices and at least one visual characteristic of each of an additional plurality of polygons with the two or more polygons;

assigning the two or more polygons to a first group and the additional plurality of polygons to a second group; and may contains additional features whereby the adding the tuple and the retrieving steps are performed for the first group of the two or more polygons without performing similar steps for the second group of the additional plurality of polygons until said steps are performed for all of the two or more polygons in the first group.

The method may contain additional features whereby the at least one visual characteristic comprises color.

The method may contain additional features whereby the generating the rendering data comprises blending the at least one visual characteristic of two or more polygons that correspond to a same pixel.

The method may contain additional features whereby the generating the rendering data is responsive to an order of the polygons.

Described is a system for displaying two or more polygons, including:

a request receiver having an input for receiving locations of two or more vertices, and at least one visual characteristic, of each of the two or more polygons, the request receiver for providing at an output the locations of the two or more vertices, and at least one visual characteristic for each of the two or more polygons;

a triangle identifier having an input coupled to the request receiver output for receiving the locations of the two or more vertices of each of the two or more polygons, the triangle identifier for identifying a triangle for each unique combination of three vertices of each polygon and for providing at an output the locations of the vertices of the triangles identified;

a data manager including a computer processor or a graphics processor, and having an input for receiving the locations of the vertices of the triangles identified, the data manager for providing at an output, for each of the triangles identified, a tuple including an identifier of the polygon corresponding to said triangle and an identifier of a pixel location for each of two or more pixels corresponding to an interior of the triangle, resulting in two or more tuples including an identifier of a same pixel location and an identifier of a same polygon being provided at the data manager output for each of two or more pixels;

a pixel toggler including the computer processor or graphics processor, having an input coupled to the data manager output for receiving the identifier of the polygon and the identifier of the pixel location for each of the pixels, the pixel toggler for, for each of the pixels, setting or clearing via an output at least one bit in a set of two or more bits in a first portion of a digital memory coupled to the pixel toggler output, each set in the first portion of the digital memory corresponding to a single pixel and each single pixel for a polygon corresponding to no more than one set of the two or more bits in the first portion of the digital memory, the set in which the at least one bit is set or cleared corresponding to the pixel location retrieved;

a rendering data builder including the computer processor or graphics processor having an input coupled to the digital memory for receiving the sets of the two or more bits, and to the request receiver output for receiving the at least one visual characteristic of the two or more polygons, the rendering data builder for rendering data from the sets of the two or more bits in the second portion of the digital memory and the at least one visual characteristic of at least some of the polygons in the two or more polygons, and providing the rendered data at an output and for directing the graphics processor to display the rendering data via an output coupled to a computer display screen, thereby displaying causing the two or more polygons to be displayed on the display screen.

The system may contain additional features whereby:

the data manager output is coupled to the pixel toggler input via a second portion of the digital memory; and the second portion of digital memory comprises at least one pointer from one tuple corresponding to a given pixel location to another tuple corresponding to the given pixel location.

The system may contain additional features whereby:

the request receiver input is additionally for receiving two or more vertices and at least one visual characteristic of each of an additional plurality of polygons with the two or more polygons;

the request receiver is additionally for providing at the request receiver output the two or more vertices and at least one visual characteristic of each of the additional plurality of polygons;

the triangle identifier output is coupled to the data manager input via a group manager;

the group manager is for assigning the two or more polygons to a first group and the additional plurality of polygons to a second group; and may contain additional features whereby operations of the data manager and the pixel toggler are performed for the first group of the two or more polygons without performing similar steps for the second group of the additional plurality of polygons until said steps are performed for all of the two or more polygons in the first group.

The system contains additional features whereby the at least one visual characteristic comprises color.

The system may contain additional features whereby the rendering data builder generates the rendering data by blending the at least one visual characteristic of two or more polygons that correspond to a same pixel.

The system may contain additional features whereby:

the at least one visual characteristic comprises an order of each of the two or more polygons; and the rendering data builder generates the rendering data is responsive to the order of the polygons.

Described is a computer program product including a nontransitory computer useable medium having computer readable program code embodied therein for displaying two or more polygons, the computer program product including computer readable program code devices configured to cause a computer system to:

receive locations of each of two or more vertices and at least one visual characteristic of each of the two or more polygons;

identify a triangle for each unique combination of three vertices of each polygon;

for each of the triangles, by a computer processor coupled to a graphics processor or by the graphics processor, add a tuple including an identifier of the polygon corresponding to said triangle and an identifier of a pixel location to a first portion of a digital memory for each of two or more pixels corresponding to an interior of the triangle, resulting in two or more tuples including an identifier of a same pixel location and an identifier of a sane polygon being simultaneously stored in the first portion of the digital memory for each of two or more pixels;

retrieve by the computer processor or graphics processor, the identifier of the polygon and the identifier of the pixel location for each of the pixels, from the first portion of the digital memory and, for each of the pixels, setting or clearing at least one bit in a set of two or more bits in a second portion of the digital memory, each set in the second portion of the digital memory corresponding to a single pixel and each single pixel for a polygon corresponding to no more than one set of the two or more bits in the second portion of the digital memory, the set in which the at least one bit is set or cleared corresponding to the pixel location retrieved;

generate by the computer processor or graphics processor rendering data from the sets of the two or more bits in the second portion of the digital memory and the at least one visual characteristic of at least some of the polygons in the two or more polygons; and direct the graphics processor to display the rendering data, thereby displaying causing the two or more polygons to be displayed on a display screen coupled to the graphics processor.

The computer program product may contain additional features whereby the first portion of digital memory comprises at least one pointer from one tuple corresponding to a given pixel location to another tuple corresponding to the given pixel location.

The computer program product may additionally include computer readable program code devices configured to cause the computer system to:

receive two or more vertices and at least one visual characteristic of each of an additional plurality of polygons with the two or more polygons;

assign the two or more polygons to a first group and the additional plurality of polygons to a second group; and contains additional features whereby the computer readable program code devices configured to cause the computer system to add the tuple and retrieve are operated for the first group of the two or more polygons without performing similar operations for the second group of the additional plurality of polygons until said operations are performed for all of the two or more polygons in the first group.

The computer program product may contain additional features whereby the at least one visual characteristic comprises color.

The computer program product may contain additional features whereby the computer readable program code devices configured to cause the computer system to generate the rendering data comprise computer readable program code devices configured to cause the computer system to blend the at least one visual characteristic of two or more polygons that correspond to a same pixel.

The computer program product may contain additional features whereby the computer readable program code devices configured to cause the computer system to generate the rendering data are responsive to an order of the polygons.

The invention claimed is:

1. A method of displaying a plurality of polygons, comprising:

receiving locations of each of a plurality of vertices and at least one visual characteristic of each of the plurality of polygons;

identifying a triangle for each unique combination of three vertices of each polygon;

for each of the triangles, by a computer processor coupled to a graphics processor or by the graphics processor, adding a tuple comprising an identifier of the polygon corresponding to said triangle and an identifier of a pixel location to a first portion of a digital memory for each of a plurality of pixels corresponding to an interior of the triangle, resulting in a plurality of tuples comprising an identifier of a same pixel location and an identifier of a same polygon being simultaneously stored in the first portion of the digital memory for each of a plurality of pixels;

retrieving by the computer processor or graphics processor, the identifier of the polygon and the identifier of the pixel location for each of the pixels, from the first portion of the digital memory and, for each of the pixels, setting or clearing at least one bit in a set of a plurality of bits in a second portion of the digital memory, each set in the second portion of the digital memory corresponding to a single pixel and each single pixel for a polygon corresponding to no more than one set of the plurality of bits in the second portion of the digital memory, the set in which the at least one bit is set or cleared corresponding to the pixel location retrieved;

generating by the computer processor or graphics processor rendering data from the sets of the plurality of bits in the second portion of the digital memory and the at least one visual characteristic of at least some of the polygons in the plurality of polygons; and directing the graphics processor to display the rendering data, thereby displaying causing the plurality of polygons to be displayed on a display screen coupled to the graphics processor.

2. A system for displaying a plurality of polygons, comprising:

a request receiver having an input for receiving locations of a plurality of vertices, and at least one visual characteristic, of each of the plurality of polygons, the request receiver for providing at an output the locations of the plurality of vertices, and at least one visual characteristic for each of the plurality of polygons;

a triangle identifier having an input coupled to the request receiver output for receiving the locations of the plurality of vertices of each of the plurality of polygons, the triangle identifier for identifying a triangle for each unique combination of three vertices of each polygon and for providing at an output the locations of the vertices of the triangles identified;

a data manager comprising a computer processor or a graphics processor, and having an input for receiving the locations of the vertices of the triangles identified, the data manager for providing at an output, for each of the triangles identified, a tuple comprising an identifier of the polygon corresponding to said triangle and an identifier of a pixel location for each of a plurality of pixels corresponding to an interior of the triangle, resulting in a plurality of tuples comprising an identifier of a same pixel location and an identifier of a same polygon being provided at the data manager output for each of a plurality of pixels;

a pixel toggler comprising the computer processor or graphics processor, having an input coupled to the data manager output for receiving the identifier of the polygon and the identifier of the pixel location for each of the pixels, the pixel toggler for, for each of the pixels, setting or clearing via an output at least one bit in a set of a plurality of bits in a first portion of a digital memory coupled to the pixel toggler output, each set in the first portion of the digital memory corresponding to a single pixel and each single pixel for a polygon corresponding to no more than one set of the plurality of bits in the first portion of the digital memory, the set in which the at least one bit is set or cleared corresponding to the pixel location retrieved;

a rendering data builder comprising the computer processor or graphics processor having an input coupled to the digital memory for receiving the sets of the plurality of bits, and to the request receiver output for receiving the at least one visual characteristic of the plurality of polygons, the rendering data builder for rendering data from the sets of the plurality of bits in the second portion of the digital memory and the at least one visual characteristic of at least some of the polygons in the plurality of polygons, and providing the rendered data at an output and for directing the graphics processor to display the rendering data via an output coupled to a computer display screen, thereby displaying causing the plurality of polygons to be displayed on the display screen.

3. A computer program product comprising a nontransitory computer useable medium having computer readable program code embodied therein for displaying a plurality of polygons, the computer program product comprising computer readable program code devices configured to cause a computer system to:

receive locations of each of a plurality of vertices and at least one visual characteristic of each of the plurality of polygons;

identify a triangle for each unique combination of three vertices of each polygon;

for each of the triangles, by a computer processor coupled to a graphics processor or by the graphics processor, add a tuple comprising an identifier of the polygon corresponding to said triangle and an identifier of a pixel location to a first portion of a digital memory for each of a plurality of pixels corresponding to an interior of the triangle, resulting in a plurality of tuples comprising an identifier of a same pixel location and an identifier of a same polygon being simultaneously stored in the first portion of the digital memory for each of a plurality of pixels;

retrieve by the computer processor or graphics processor, the identifier of the polygon and the identifier of the pixel location for each of the pixels, from the first portion of the digital memory and, for each of the pixels, setting or clearing at least one bit in a set of a plurality of bits in a second portion of the digital memory, each set in the second portion of the digital memory corresponding to a single pixel and each single pixel for a polygon corresponding to no more than one set of the plurality of bits in the second portion of the digital memory, the set in which the at least one bit is set or cleared corresponding to the pixel location retrieved;

generate by the computer processor or graphics processor rendering data from the sets of the plurality of bits in the second portion of the digital memory and the at least one visual characteristic of at least some of the polygons in the plurality of polygons; and direct the graphics processor to display the rendering data, thereby displaying causing the plurality of polygons to be displayed on a display screen coupled to the graphics processor.

* * * * *